Inventor

MAARTEN GELEYNSE by: Cavanagh & Norman

May 2, 1967  M. GELEYNSE  3,317,744
PULSE GENERATOR WITH CAPACITOR ALTERNATELY CHARGED BY
D.C. PULSES THROUGH S.C.R. SWITCHING MEANS
AND DISCHARGED THROUGH INDUCTOR

Filed Aug. 8, 1963  3 Sheets-Sheet 3

Inventor
MAARTEN GELEYNSE
by: Cavanagh & Norman

United States Patent Office 3,317,744
Patented May 2, 1967

3,317,744
PULSE GENERATOR WITH CAPACITOR ALTERNATELY CHARGED BY D.C. PULSES THROUGH S.C.R. SWITCHING MEANS AND DISCHARGED THROUGH INDUCTOR
Maarten Geleynse, Clarkson, Ontario, Canada, assignor to Barringer Research Ltd.
Filed Aug. 8, 1963, Ser. No. 300,747
6 Claims. (Cl. 307—88.5)

The invention relates to a pulse generator of particular utility in the production of high current pulses into inductive loads. Some of the recent developments in geophysical prospecting have utilized the generation of pulse type inductive fields as a means of locating conductive bodies and defining their characteristics according to their transient response to pulsating magnetic fields. Geophysical equipment of this type requires the use of lightweight, high efficiency pulse generators, which are capable of producing high current pulses into inductive loads of large turns area. In order to produce pulsating magnetic fields capable of exciting transient responses at ranges up to 1000 feet or more, it is a requirement that the pulse waveform generated should contain sharp discontinuities, such as an abrupt termination, since the class of geophysical methods for which this invention is primarily intended depends upon the measurement of transient effects which follow sharp discontinuities in the generated waveforms.

In various known pulse generators the pulse energy was dissipated in resistive loads which formed part of the pulse forming network or in some cases the pulse energy was in fact released in the form of, for example, a discharge or spark. In either case such partial or total losses rendered the operation of such a pulse generator relatively wasteful in terms of power consumption and, where high energy pulses were required, relatively heavy and complex construction. In addition, even where such pulse energy was not fully released, the use of a uni-polar pulse required that the energy remaining at the termination of the pulse be wasted and complete recharging from zero, and in some cases from negative polarity, took place.

The general term pulse generator also comprises oscillators in which a discrete pulse, as such, is not produced in useful form, but a continuous series of pulses or oscillations are generated, with low power consumption, as compared with other conventional pulse generators. However such oscillators are of little or no use where discrete pulses are required spaced apart by predetermined intervals of zero energy.

While some pulse generators of the prior art have been adequate in pulse power available they have been deficient in one or more other material factors. Similarly where light weight has been achieved it has commonly been at the price of a reduction in power output and other disadvantages. Further disadvantages have been exhibited by such prior generators rendering them otherwise unsuitable.

In U.S. patent application S.N. 551, filed Jan. 5, 1960, by Anthony Rene Barringer, now Patent No. 3,105,934, there is disclosed a pulse generator for use in airborne electromagnetic survey equipment which is highly advantageous in a variety of ways, including pulse power output, repetition rate, adjustability and reliability. However, the generator, although being light and compact as compared to prior generators is, nevertheless of such a size and power consumption as to impose limitations on the aircraft carrying out the survey which in turn involves a fairly high outlay on flying expense when surveying by this method.

In addition, in the pulse generator disclosed therein, the pulse is of the same polarity, i.e.—positive, at all times, which in turn results in the generation of a secondary transient in conductive bodies which is also of the same sign at all times which was to some extent disadvantageous for various reasons apart from the power consumption involved.

The present invention represents a simple lightweight and highly efficient circuit for the generation of suitable bi-polar current pulses typically of half sine wave shapes at predetermined intervals spaced apart in timed relation.

A novel feature of the instant pulser is the manner in which energy storage is alternately transferred from the magnetic field to the electric field. The circuit to some extent can be considered as an oscillator in which the oscillations are momentarily suspended following the collapse of the magnetic field in the inductive part of the circuit at which time the potential energy of the circuit has been transferred to capacitive storage. The energy stored in the capacitor is held for a duration fixed by the desired repetition rate of pulses, and is then switched back into the inductive portion of the circuit in order to produce a current pulse in the reverse direction to the preceding one. It is necessary to add sufficient energy to the circuit to make up for resistive and dielectric losses, this being carried out by switching in a supply voltage in alternately reversing directions to the capacitor.

In the invention the inductive portion of the circuit is the radiating loop which generates the required pulses of magnetic field, and the concept forms a simple and efficient way for generating high current half sine wave shaped bi-polar pulses in the radiating loop or other inductive load. By the use of low loss switching components in the circuit, such as silicon controlled rectifiers, the efficiency depends primarily upon the resistive losses of the radiating loop or other inductive load, and by using heavy gauge copper wire these losses can be reduced to an absolute minimum whereby a far higher portion of the power input to the pulser available for example, for conversion into pulsating magnetic fields, than with earlier designs.

In addition, according to the present invention the polarity of the pulse generated by the instant pulse generator is alternatively reversed producing electromagnetic pulses which are alternately reversed in direction thus resulting in secondary transients which are also alternatively reversed which facilitates improved methods of signal processing particularly with reference to the elimination of noise.

Accordingly it is an object of this invention to provide a pulse generator of the type described which is economic to install and operate and is effective and reliable in use.

More particularly it is an object of this invention to provide a pulse generator having the foregoing advantages which is light and compact and of low power consumption.

More particularly it is an object of this invention to provide a pulse generator having the foregoing advantages which produces a high energy pulse while operating on a low voltage battery source.

More particularly it is an object of this invention to provide a pulse generator having the foregoing advantages which operates at a high repetition rate and is readily adjustable.

More particularly it is an object of this invention to provide a pulse generator having the foregoing advantages which is particularly suitable for airborne and mobile electromagnetic survey operations.

More particularly it is an object of the invention to provide a pulse generator having the foregoing advantages in which the pulse generated is alternatively reversed.

The foregoing and other advantages will become apparent from the following description of a preferred embodiment of the invention.

A preferred embodiment of the invention will now be described by way of example only with reference to the following drawings in which like references refer to like parts thereof throughout the various views and diagrams and in which.

Figure 1:
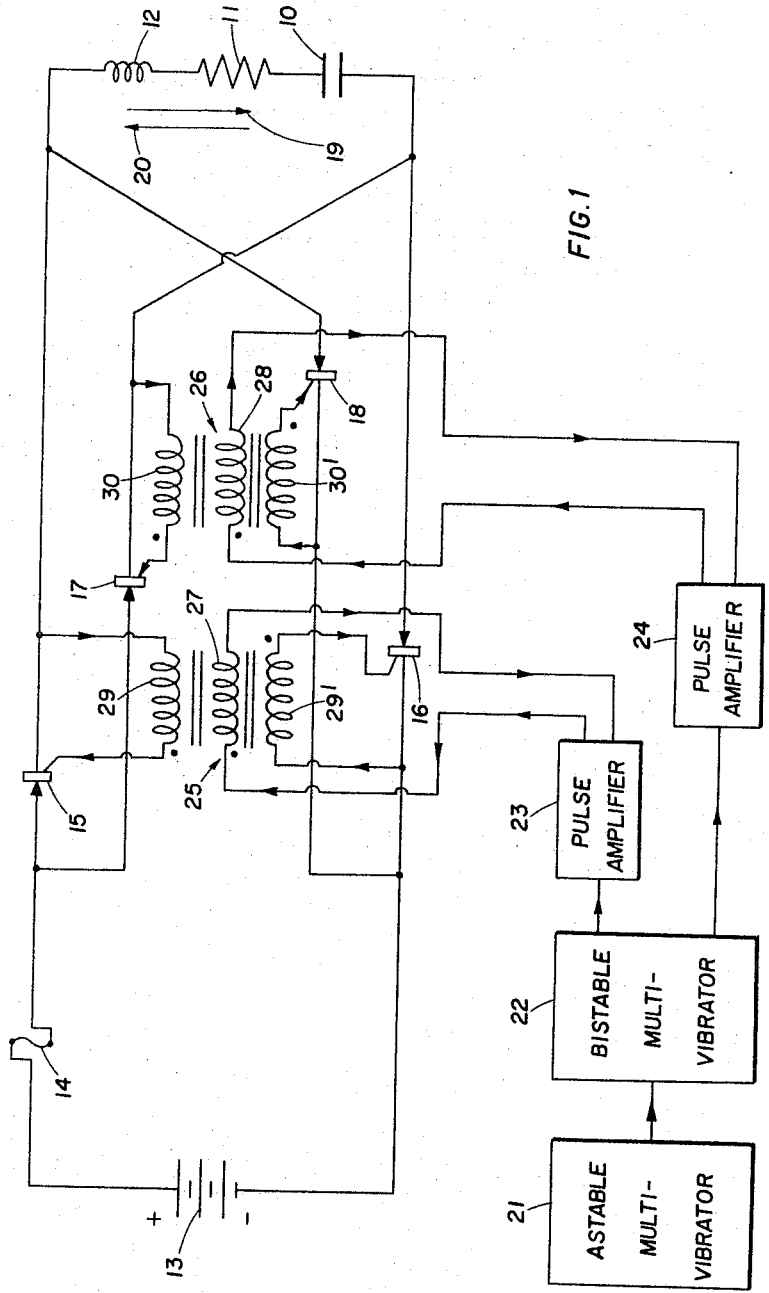
FIGURE 1 is a circuit diagram of a pulse generator according to the invention with portions thereof shown schematically.

From FIGURE 1 it will be seen that the pulse generator of this preferred embodiment comprises condenser 10 connected in series with a resistance 11 and a radiating loop 12, to battery power source 13 through fuse 14. Resistance 11 and loop 12 are shown separately in this example for the sake of clarity and it will be appreciated that in fact resistance 11 is incorporated in loop 12 and does not constitute a separate member. In order to operate the circuit there are provided two pairs of identical silicon controlled rectifiers 15, 16 and 17, 18 which are operable in pairs simultaneously as coupled circuit breakers, so that either rectifiers 15 and 16 are conductive and current will flow in the direction of arrow 19 or alternately so that rectifiers 17 and 18 are conductive and current will flow in the reverse direction, as shown by arrow 20.

In this way condenser 10 is alternately charged on one side and on the other, the charge building up rapidly to a predetermined maximum according to an equation which will be discussed below.

Rectifiers 15, 16, 17 and 18 are semi-conductor devices that behave essentially like thyratrons but at much lower voltages and higher currents. When connected to a power source (battery 13) and a load (condenser 10 and loop 12) the semi-conductor rectifiers will block the current until turned "on" by a trigger pulse of typically 3 volts having a pulse width of 10 microseconds. Once "on" they will stay conductive until "turned off" by either removing the voltage source, or by reversing the polarity of the voltage across them. In this preferred embodiment the "voltage reversal" technique operates to render the rectifiers non-conductive.

Figure 3A:
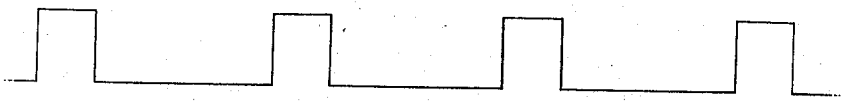
FIGURES 3A, 3B and 3C are diagrams of the input or triggering pulses applied to the pulse generator at stages in their development.

In order to achieve rapid and regular operation of rectifiers 15, 16 and 17, 18 at predetermined spaced intervals, the astable multivibrator 21 is provided which delivers at its output terminal voltage pulses of about 20 volts at a constant repetition rate of typically 250 pulses per second, substantially as shown in FIGURE 3A, and which is adjustable to vary the repetition rate over a range of say 200 to 300 p.p.s. to obtain optimum results in various conditions. It is operated by a D.C. power source (not shown) of about 600 milliwatts. In this preferred embodiment the standard aircraft batteries delivering 28 volts are sufficient.

Figure 3B:
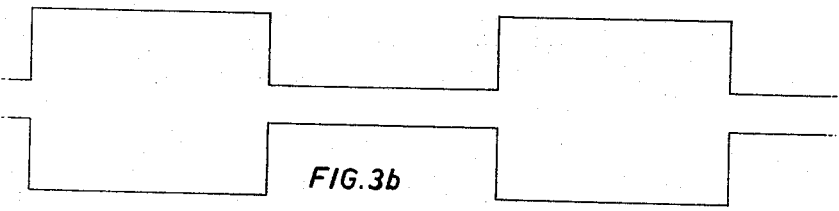

Multivibrator 21 in turn is connected to the bistable multivibrator 22 (or so-called "flip-flop"), having two output terminals and converting the input pulse of 250 p.p.s. to two alternate output signals of 125 p.p.s. at each terminal substantially as shown in FIGURE 3B. The amplitude is again 20 volts.

Figure 3C:
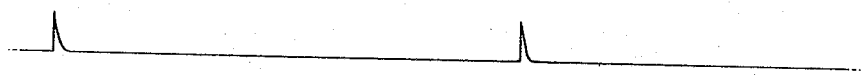

The two output signals in turn are fed to separate pulse shapers 23 and 24 which operate in response to the leading edge of the positive going pulse only, the negative portions being rejected. These shaped pulses shown in FIGURE 3C are in turn passed to transformers 25 and 26 which each comprise primary winding 27 and 28 and two secondary windings 29, 29' and 30, 30', and pulses are generated therein which provide triggering pulses for rectifiers 15, 16, 17 and 18 connected thereto.

In operation the above pulse generator behaves according to the following principles and the following symbols are used in this explanation:

$V_b$ is the original voltage of battery 13.
L is the nominal inductance in henries of the radiating loop 12.
R is the total circuit resistance including battery wiring and loop in ohms.
C is the nominal capacitance of condenser 10 in farads.
$i$ is the current in amps flowing in the circuit.
$Ec$ is the voltage across the condenser.
$t$ is the time in seconds.
$a$ a factor equal to $R/2L$.
$\beta$ is a factor equal to $\sqrt{1/LC}$.
$\pi = 3.14$.
W is the length of the current pulse.

When a triggering pulse is applied to rectifiers 15 and 16 current will flow from battery 13 through loop 12 in the direction of arrow 19. The magnitude of the current may be expressed as:

$$i_1 = \frac{V_b}{\sqrt{L/C}} e^{-at} \sin \beta t$$

Figure 4A:
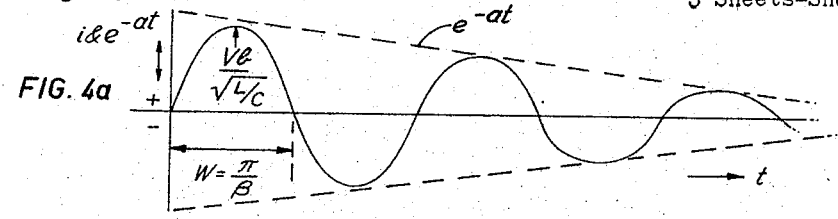
FIGURES 4A, 4B and 4C are diagrams which accompany the mathematical explanation of the operation of the pulse generator to FIGURE 1.
Figure 4B:
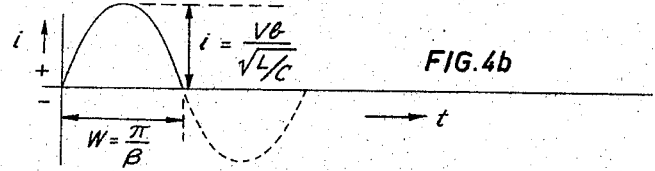

If rectifiers 15 and 16 remained conductive then according to this expression the current $i_1$ would behave as a damped sinusoid substantially as shown in FIGURE 4A. However, since rectifiers 15 and 16 will not permit current to flow in the reverse direction, due to the change in polarity which occurs when the condenser 10 becomes charged rendering rectifiers 15 and 16 non-conductive, the actual current pulse in the circuit appears substantially as shown in FIGURE 4B, where the duration of the pulse (W) is expressed as:

$$W = \pi/\beta$$

seconds.

Figure 4C:
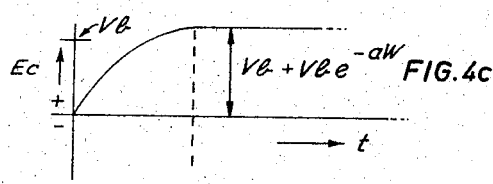

During the initial current pulse the voltage across the condenser C will increase according to the expression:

$$Ec_1 \sim V_b + V_b e^{-at} \sin (\beta - \theta)$$

where $\theta = \pi - \arctan \beta/a \sim \pi/2$ for practical purposes. At the end of the current pulse (at, $t = W = \pi/\beta$) the condenser voltage is $Ec_1(\max) = V_b + V_b e^{-aW}$ and is larger than the battery voltage by an amount $V_b e^{-aW}$ and has a polarity substantially as shown in FIGURE 4C.

After a short, predetermined delay, rectifiers 17 and 18 receive a triggering pulse as described above completing the circuit between the condenser 10 and battery 13 once more and current will again flow, with reverse polarity, in the direction of arrow 20. The total voltage now impressed across the circuit will basically comprise the sum of the condenser voltage and the battery voltage according to the following expression:

$$V_b + [V_b + V_b e^{-aW}] = V_b + Ec_1^W(\max)$$

The current (i.e. second pulse) now flowing through the circuit in the direction of arrow 20 may be expressed as:

$$i_2 = \frac{(V_b + Ec_1(\max))}{\sqrt{\frac{L}{C}}} e^{-at} \sin \beta t$$

At the end of the second current pulse the voltage across condenser C has reversed in polarity and has increased in magnitude as follows:

$$Ec_2(\max) = V_b + [V_b + Ec_1(\max)] e^{-aW}$$

Figure 2:
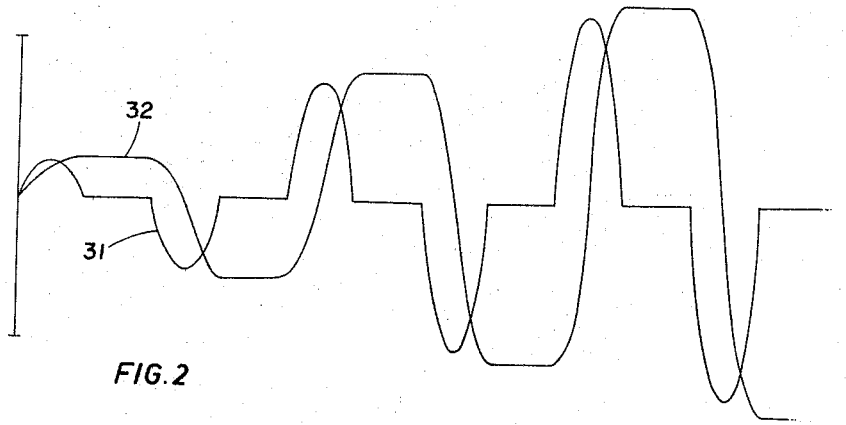
FIGURE 2 is a diagram of the initial progression of current and voltage pulses in the pulse generator of FIGURE 1.

Referring now to FIGURE 2, curve 31 represents the current flowing in the instant pulse generator and curve 32 represents the voltage across the condenser 10 and it will be seen that on each pulse such voltage will increase and will reverse in polarity. After $n$ pulses, the maximum voltage achieved across condenser 10 may be expressed as:

$$Ec_n(\max) = V_b + [V_b + Ec_{(n-1)}]e^{-aW}$$

The circuit current $i$ and the voltage $Ec$ across condenser 10 will ultimately level off when the amount of energy supplied by battery 13 during each pulse equals the amount of energy dissipated in the circuit resistance or when $$Ec_n(\max) = Ec_{(n-1)}(\max)$$

Under these equilibrium conditions the voltage may be expressed as:

$$Ec(\max) = V_b + [V_b + Ec(\max)]e^{-aW}$$

or $$Ec(\max) = \frac{1+e^{-aW}}{1-e^{-aW}} V_b$$

Since $a = R/2L$, then $Ec(\max)$ will increase as the circuit resistance $R$ is decreased.

$$Ec(\max) = \infty \text{ when } R = 0$$

The peak value of the current pulse at equilibrium conditions may be expressed as:

$$i_n(\max) = \frac{[V_b\,Ec_n\,(\max)]W}{\pi L} e^{-\frac{RW}{4L}}$$

While the foregoing pulse generator is of wide flexibility, the repetition rate of the astable multivibrator 21 must be limited according to the expression:

$$n < \frac{1}{\text{Pulse width}} = \frac{1}{\pi\sqrt{LC}}$$

where $n$ is the number of pulses per second. Various suitable circuits for both astable and bistable multivibrator are disclosed in "Transistor Circuit Design" by the Engineering Staff of Texas Instruments Inc. published by McGraw-Hill, 1963.

Assuming the limiting voltage achieved across condenser 10 is 400 volts, $C = 100$ mfd., corresponding to $L = 1.5$ millihenries, $R = .75$ ohm, then subsequent discharge and recharge thereof as described will produce an alternating electromagnetic field or waveform radiating from loop 12 on each occasion at a peak current of approximately 100 amps. The pulse will, therefore, have an apparent peak power of 40 kilovoltamps. However, such peak power is only momentarily achieved to build up the electromagnetic field, the total pulse time being only of the order of about 1.5 milliseconds.

It will thus be seen that when stable conditions have been reached, after about 5 to 20 pulses in a typical case, the circuit produces a continuous series of pulses which are bi-polar that is to say of alternate polarity and in which the energy of each pulse is continually used and stored, less losses due to resistance in the circuit. The stored pulse is raised to the predetermined stable level by the power source which represents a comparatively minor power consumption as against prior pulses in which the substantial residual pulse energy was not stored but was wasted and an entirely new condensed charge created.

As stated above it will be apparent that the maximum voltage generated across condenser 10 depends upon the circuit resistance 11 and in certain airborne applications this may create problems. Thus where it is desired to radiate a higher energy electromagnetic field a substantial pulse must be passed around radiating loop 12. However, in order to achieve a high enough pulse the resistance of loop 12 must be substantially reduced, which would result in the use of very thick wire. Since in the airborne application the loop 12 is stretched from nose to wingtip to tail to wingtip to nose, such a loop construction may be impossible and impair performance of the aircraft. In such circumstances a loop 12 of lighter construction, and hence greater resistance is used and a modified form of the invention is employed as shown in FIGURE 5.

The principal difference in this alternative embodiment lies in the use of a power source delivering electrical power at a voltage approximately equal to the pulse voltage but at relatively low amperage, having a power output in the region of 2.5 to 3 kilowatts, which is preferably achieved by the use of an A.C. 3 phase generator delivering 115 v. A.C. per phase at 400 cycles per second, stepping up the voltage to 270 v. A.C. by a transformer and rectifying it to 400 v. D.C. with a full-wave rectifier. Alternatively battery power may be used although this may involve excessive weight and wastage of space in some cases.

Figure 5:
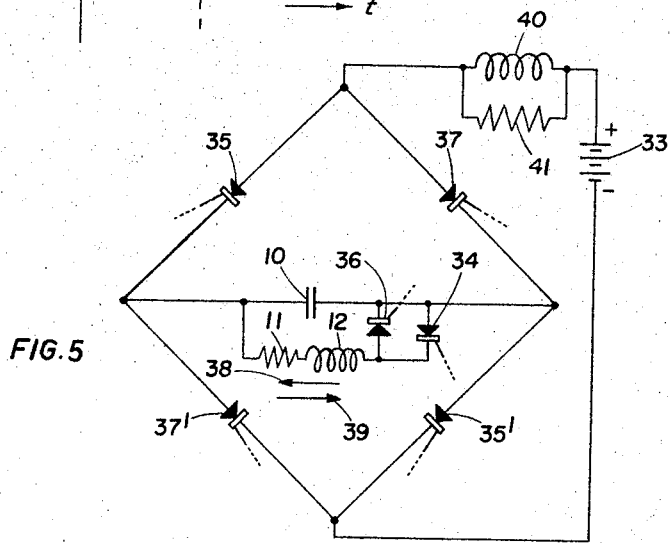
FIGURE 5 is a circuit diagram of an alternative embodiment of the invention.

This alternative embodiment will be seen from FIGURE 5 to comprise condenser 10, resistance 11 and radiating loop 12, coupled to power generator 33 described above. The silicon controlled rectifiers in this embodiment operate in two groups of three, rectifiers 34 and 35–35' forming one group and 36 and 37–37' forming the other group to permit current to flow in one or other direction in the circuit as indicated by arrows 38 and 39. Rectifiers 34 and 35–35' and rectifiers 36 and 37–37' are triggered by trigger pulse generators not shown, of similar design to multivibrators 21 and 22 and controlling their associated rectifiers by means of similar transformer windings as described above which are omitted here for sake of clarity. In addition inductance 40 and resistance 41 are provided in the circuit, being carefully proportioned with condenser 10.

In operation condenser 10 may be assumed to be fully charged and all rectifiers non-conductive. Rectifier 34 is triggered and condenser 10 will then discharge, current flowing through loop 12 in the direction of arrow 38. This will reverse the polarity of condenser 10 and rectifier 34 will become non-conductive.

After a brief delay rectifiers 35–35' are simultaneously triggered and current flows from power generator 33 through inductance 40 and resistance 41 and through condenser 10, bringing the partial reverse polarity charge up to its original level and slightly exceeding that of generator 33 thus reversing the polarity of the current and rendering rectifiers 35–35' non-conductive.

Rectifier 36 is then triggered and condenser 10 discharges through loop 12 and resistance 11 in the reverse direction, as in arrow 39. Partial recharging of condenser 10 with reverse polarity occurs thus rendering rectifier 36 non-conductive. After a brief delay rectifiers 37–37' are triggered allowing current to flow from power generator 33 through inductance 40 and resistance 41 and through condenser 10, bringing the same up to its full charge again, slightly in excess of generator 33 thus reversing the polarity of the current and rendering rectifiers 37–37' non-conductive. In this way a pulse is passed repeatedly through loop 12 alternatively reversing its direction and at a high rate of repetition.

Figure 6:
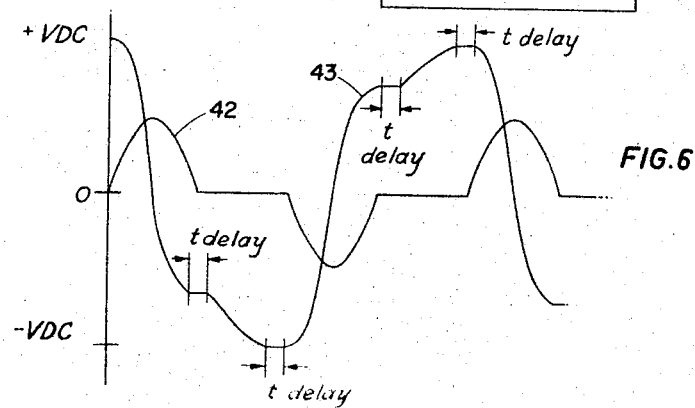
FIGURE 6 is a diagram of the progression of current and voltage pulses in the embodiment of FIGURE 5.

This alternative embodiment will thus be seen to operate in a cycle generally similar to that of the embodiment of FIGURE 1 when the latter has reached its stable operating condition except that the substantially increased charge added to bring the condenser up to the full pulse charge once more is applied after a small time delay as will be apparent from FIGURE 6 curve 42 representing current and curve 43 representing voltage. The advantages of re-use of residual condenser charge, and of the generation a bi-polar pulse are however maintained.

The foregoing is a description of a preferred embodiment of the invention which is given by way of example only. The invention is not to be taken as limited to any of the specific features described and comprehends all such changes as come within the spirit and scope of the following claims.

What I claim is:

1. A pulse generator for energizing an inductive loop with high amplitude, time spaced current pulses of half sine waveform comprising:
   (a) a capacitor which forms a normally open, underdamped, oscillatory circuit with the inductive loop,
   (b) means for periodically supplying the oscillatory circuit with electrical energy,
   (c) controllable switch means for periodically:
      (i) completing the oscillatory circuit to initiate a damped sinusoidal oscillation therein,
      (ii) opening the oscillatory circuit immediately after each half cycle of said oscillation whereby current flowing through the inductive loop consists of half sine pulses, energy in said oscillatory circuit being transferred between the inductive loop and the capacitor during said pulses whereby energy stored in the capacitor during a given pulse is added to the next successive pulse, and
   (d) means for periodically activating said switch means to initiate said sinusoidal oscillation.

2. A pulse generator as claimed in claim 1 wherein the inductive loop and the capacitor are connected in series with a direct current source by means of controlled rectifiers, and wherein means is provided for reversing the polarity of successive pulses.

3. A pulse generator as claimed in claim 2 wherein the controlled rectifiers comprise two pairs of controlled rectifiers each having a gate electrode, each pair connecting the inductive loop, the capacitor and the direct current source in separate series circuits, said pairs being operable separately and operatively connected so that when one pair is conductive the current pulses flow in one direction through the inductive loop and when the other pair is conductive the current pulses flow in the opposite direction through the inductive loop.

4. A pulse generator as claimed in claim 3 wherein the activating means includes an astable multivibrator adapted to generate spaced periodic square waves at a predetermined uniform repetition rate, a bistable multivibrator adapted to generate two separate groups of periodic square waves each of similar phase but of opposite polarity to the other, and means for converting said two separate groups of periodic square waves into two separate groups of periodic trigger pulses, the trigger pulses being of predetermined relative phase, one group of trigger pulses being applied to the gate electrodes of one pair of controlled rectifiers, the intervals between successive pulses being applied to the gate electrodes of the other pair of controlled rectifiers, the intervals between successive pulses being approximately equal to the width of said pulses.

5. A pulse generator as claimed in claim 1 wherein means is provided for periodically connecting the capacitor with a direct current source to charge the capacitor to the voltage of said direct current source, and wherein the switch means includes a controllable rectifier that is adapted to periodically connect the capacitor across the inductive loop when the capacitor is disconnected from the direct current source, so that energy stored by the capacitor is permitted to periodically circulate through the inductive loop in the form of a current pulse.

6. A pulse generator as claimed in claim 5 wherein the capacitor is connected with the direct current source by means of two pairs of controlled rectifiers that are operable to successively reverse the polarity of the charge on the capacitor following successive pulses, and wherein the switch means includes two controlled rectifiers that are operable to successively reverse the polarity of the current pulses flowing through the inductive loop.

References Cited by the Examiner

UNITED STATES PATENTS

| | | | |
|---|---|---|---|
| 2,735,014 | 2/1956 | Rado | 331—173 |
| 2,941,125 | 6/1960 | Lippincott | 328—65 X |
| 2,963,659 | 12/1960 | Dunwoodie | 328—60 |
| 3,264,491 | 8/1966 | Davis | 307—88.5 |

JOHN W. CALDWELL, *Primary Examiner.*

J. T. STRATMAN, *Assistant Examiner.*